United States Patent
Nieuwenhuys et al.

(10) Patent No.: US 11,645,675 B2
(45) Date of Patent: May 9, 2023

(54) IDENTIFYING PERSONAL CHARACTERISTICS USING SENSOR-GATHERED DATA

(71) Applicant: AdsWizz Inc., San Mateo, CA (US)

(72) Inventors: Bruno Nieuwenhuys, Sunnyvale, CA (US); Victor Mocioiu, Bucharest (RO); Sergiu Alexandrescu, Bucharest (RO); Ciprian Caba, Botosani (RO); Alexandru Cotiga, Bucharest (RO)

(73) Assignee: AdsWizz Inc., San Mateo, CA (US)

( * ) Notice: Subject to any disclaimer, the term of this patent is extended or adjusted under 35 U.S.C. 154(b) by 556 days.

(21) Appl. No.: 15/475,417

(22) Filed: Mar. 31, 2017

(65) Prior Publication Data
US 2018/0285319 A1 Oct. 4, 2018

(30) Foreign Application Priority Data

Mar. 30, 2017 (RO) .............................. a 2017 00191

(51) Int. Cl.
*G06F 17/18* (2006.01)
*G06N 99/00* (2019.01)
(Continued)

(52) U.S. Cl.
CPC ......... *G06Q 30/0269* (2013.01); *G06N 5/003* (2013.01); *G06N 20/00* (2019.01);
(Continued)

(58) Field of Classification Search
CPC ... A61B 5/1118; A61B 5/7275; A61B 5/4866; G06F 9/4843; G06F 8/65; G06F 9/542; G06F 9/4893
See application file for complete search history.

(56) References Cited

U.S. PATENT DOCUMENTS

2011/0231419 A1* 9/2011 Papke .................. G06F 16/784
707/756
2013/0267794 A1* 10/2013 Fernstrom .............. G01N 33/02
600/301

(Continued)

OTHER PUBLICATIONS

Anguita, D., et al., "A Public Domain Dataset for Human Activity Recognition Using Smartphones," European Symposium on Artificial Neural Networks (ESANN), Computational Intelligence and Machine Learning, Apr. 24-26, 2013, pp. 437-442.

(Continued)

*Primary Examiner* — Andrew Schechter
*Assistant Examiner* — Jeremy A Delozier
(74) *Attorney, Agent, or Firm* — Fenwick & West LLP (57) ABSTRACT

An online system trains machine learning models that, when applied to gathered sensor data, determines personal characteristics (e.g., age, gender, height) of an individual in a non-intrusive manner. Specifically, the online system trains a first machine learning model that analyzes sensor data gathered from a client device associated with the individual. The first machine learning model determines whether a trigger event, such as whether the individual is walking, is currently occurring. A second machine learning model trained by the online system analyzes sensor data corresponding to the trigger event to identify the personal characteristics of the walking individual.

18 Claims, 5 Drawing Sheets

(51) Int. Cl.
  *G06Q 30/02* (2012.01)
  *G06Q 30/0251* (2023.01)
  *G06N 20/00* (2019.01)
  *G06N 20/20* (2019.01)
  *G06N 5/00* (2023.01)
  *G06N 20/10* (2019.01)
  *G06N 3/04* (2023.01)
  *G06N 7/00* (2023.01)
  *H04L 67/50* (2022.01)

(52) U.S. Cl.
  CPC ........... *G06N 20/20* (2019.01); *G06N 3/0454* (2013.01); *G06N 7/005* (2013.01); *G06N 20/10* (2019.01); *H04L 67/535* (2022.05)

(56) References Cited

U.S. PATENT DOCUMENTS

| | | | | |
|---|---|---|---|---|
| 2014/0063237 A1* | 3/2014 | Stone | ............. | H04N 7/181 348/143 |
| 2015/0061938 A1* | 3/2015 | Moraleda | ............. | G01S 5/0294 342/452 |
| 2015/0199010 A1* | 7/2015 | Coleman | ............. | A61B 5/0006 345/156 |
| 2016/0134785 A1* | 5/2016 | Greene | ............. | H04N 5/04 348/500 |
| 2016/0331279 A1* | 11/2016 | Shpin | ............. | G06Q 30/0269 |

OTHER PUBLICATIONS

Jain, A., et al., "Investigating Gender Recognition in Smartphones using Accelerometer and Gyroscope Sensor Readings," International Conference on Computational Techniques in Information and Communication Technologies (ICCTICT), 2016, pp. 623-628.

Molay, D., et al., "Learning Characteristics of Smartphone Users from Accelerometer and Gyroscope Data," retrieved Jan. 18, 2017, from the internet: <http://cs229.stanford.edu/proj2013/MolayKoungTam-LearningCharacteristicsOfSmartphoneUsersFromAccelerometerAndGyroscopeData.pdf>.

Riaz, Q., et al., "One Small Step for a Man: Estimation of Gender, Age and Height from Recordings of One Step by a Single Inertial Sensor," Sensors, 2016, vol. 15, Issue 12, 16 pages.

* cited by examiner

IDENTIFYING PERSONAL CHARACTERISTICS USING SENSOR-GATHERED DATA

CROSS REFERENCE TO RELATED APPLICATION

This application claims the benefit of Romanian App. No. A/10020/2017, filed Mar. 30, 2017, which is hereby incorporated by reference in its entirety.

TECHNICAL FIELD

The disclosure generally relates to the field of data processing, and more specifically to determining an individual's personal characteristics through gathered sensor data corresponding to the individual's movement.

BACKGROUND

Determining an individual's personal characteristics, such as an individual's gender, height, and age through remote, non-intrusive methods is an ongoing field of research. Solving this issue is useful for fields that range from biometric security, health monitoring, to enhancing user experience via custom targeted features (i.e., custom advertising, automatically displaying a gender specific section of a website).

Conventional systems and methods for determining an individual's personal characteristics have been carried out with varying degrees of success. One problem with conventional methods is the need for user compliance. Namely, an individual may be required to wear a dedicated sensor on an anatomical location (e.g., chest, lower back, right wrist, or left ankle of the user). The dedicated sensor can gather data and make the determination as to the individual's personal characteristics. However, this conventional approach is inapplicable to real-life situations because of the dedicated sensor that needs to be constantly worn by an individual in order to gather the necessary data. Another problem that conventional systems and methods suffer from is the poor accuracy in identifying a user's personal characteristics. As such, inaccurately identified personal characteristics result in sub-optimal applications such as improperly targeted content to the individual, and a more accurate system without restrictions is lacking.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

CONFIGURATION OVERVIEW

Disclosed by way of example embodiments are methods for identifying an individual's personal characteristics using sensor data gathered from the individual. For example, an online system can train and apply machine learning models that are trained to accurately identify personal characteristics of the individual. The subsequent disclosure will be described in reference to two phases: 1) a training phase and 2) a deployment phase. Generally, the online system trains the machine learning models during the training phase such that during the deployment phase, the trained machine learning models can more accurately identify personal characteristics of an individual.

Specifically, during the training phase, the online system trains a first machine learning model to effectively detect a trigger event. A trigger event describes an event that, when detected by the online system, causes the online system to instruct the sensors of the client device to continuously gather data. As an example, a detected trigger event may be detection of a walking individual. Therefore, the sensor of the client device continuously gathers sensor data corresponding to the motion of the walking individual. The online system can further train, during the training phase, a second machine learning model that performs a classification task for identifying an individual's personal characteristics. Therefore, during the deployment phase, the second machine learning model can be applied to the gathered sensor data to accurately determine the personal characteristics of the walking individual. As an example, an individual's personal characteristics include, but are not limited to, an individual's gender, height, or age.

Having accurately identified personal characteristics of an individual, the information can be used for application purposes. As one example, the online system can provide targeted content that would be best suited for the individual given the accurately identified personal characteristics of the individual.

Example System for Identifying Personal Characteristics

Figure 1:
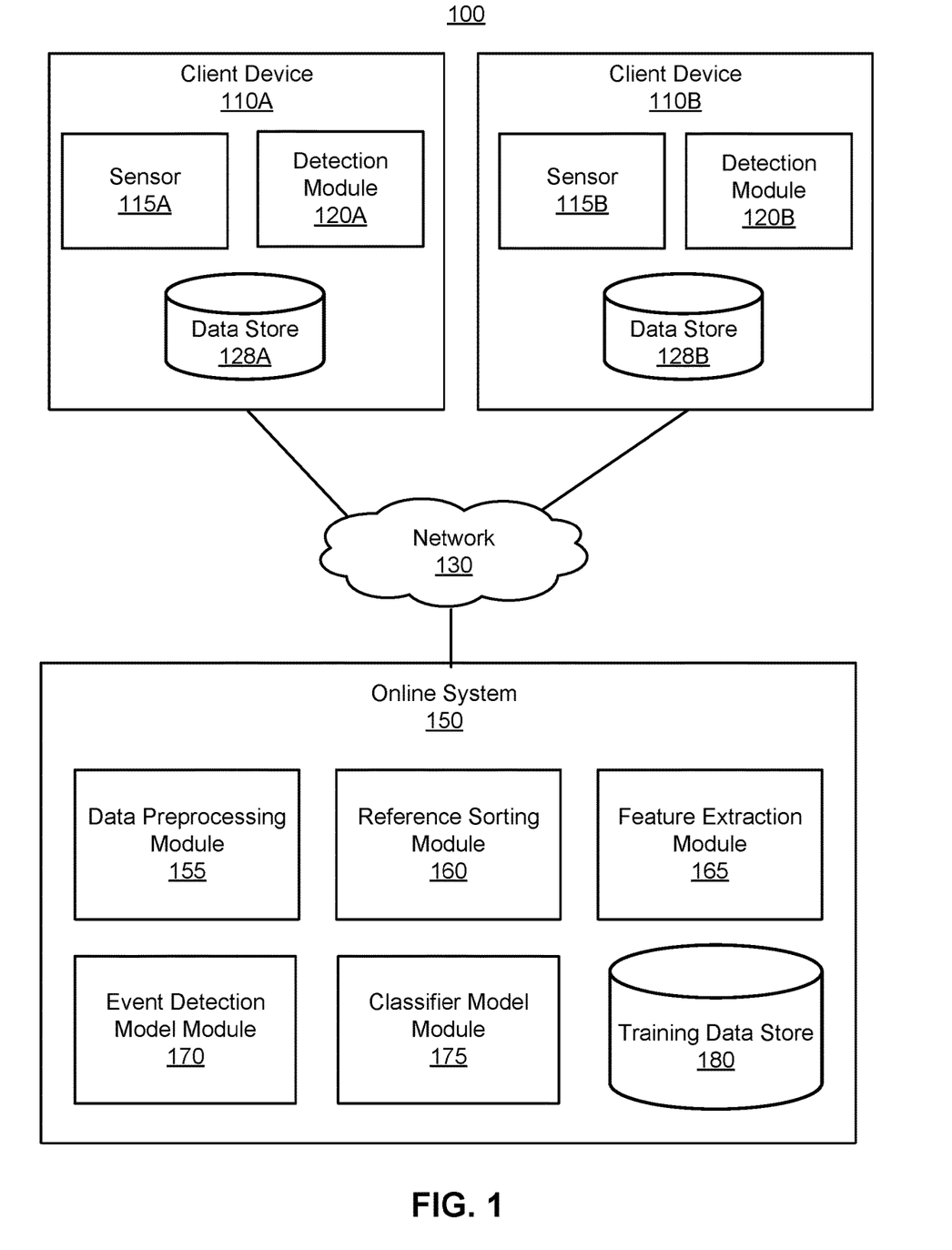
FIG. 1 illustrates an example environment for identifying personal characteristics using sensor-gathered data, in accordance with an embodiment.

FIG. 1 illustrates an example environment 100 for identifying an individual's personal characteristics using sensor-gathered data, in accordance with an embodiment. The environment 100 includes one or more client devices 110 connected through a network 130 to an online system 150. Specifically, each client device 110 may include a sensor 115 and a detection module 120. The online system 150 may include a data preprocessing module 155, a reference sorting module 160, a feature extraction module 165, an event detection model module 170, and a classifier model module 175. Although the illustrated environment 100 may include the elements shown in FIG. 1, in other embodiments the environment 100 may include different elements. Furthermore, the functionalities of each element may be distributed differently among the elements in other embodiments.

Example Network

The network 130, which can be wired, wireless, or a combination thereof, enables communications between the client devices 110 and the online system 150. The network 130 may include the Internet, a local area network (LAN), virtual LAN (VLAN) (e.g., with VPN), wide area network (WAN), or other network. In one embodiment, the network 130 uses standard communications technologies and/or protocols, such as Hypertext Transfer Protocol (HTTP), Transmission Control Protocol/Internet Protocol (TCP/IP), Uniform Resource Locators (URLs), and the Doman Name System (DNS). In another embodiment, the client devices 110 and/or the online system 150 can use custom and/or dedicated data communications technologies instead of, or in addition to, the ones described above.

Example Client Device

The client devices 110 are electronic devices associated with an individual. Client devices 110 can be used by individuals to perform functions such as consuming digital content, executing software applications, browsing websites hosted by web servers on the network 130, downloading files, and interacting with content provided by the online system 150. For example, the client devices 110 may include cell phones, tablets, dedicated e-readers, smartphones, wearables (e.g., smartwatches or pendants), or tablets, laptops, or desktop computers configured similar to an exemplary machine (or computing system) described in reference to FIG. 5. A client device 110 may include one or more executable applications, such as a web browser, to interact with services provided by the online system 150. In another scenario, the executable application may be a particular application designed by the online system 150 and locally installed on the client device 110. Although two client devices 110 are illustrated in FIG. 1, in other embodiments the environment 100 may include fewer (e.g. one) or more client devices 110.

In various embodiments, the client device 110 includes one or more sensors 115 that are each configured to gather data from the surrounding environment of the client device 110. Sensors 115 of the client device 110 may include, but are not limited to, an accelerometer, a gyroscope, a capacitive or resistive screen, a proximity sensor, a microphone, a temperature sensor, a camera, a fingerprint sensor, a magnetometer, barometer, ambient light sensor, and one or more input mechanisms or buttons. Each type of sensor 115 is configured to gather a particular type of data. For example, if the sensor 115 is an accelerometer of the client device 110, the sensor 115 may record any of:

The linear acceleration of one or more axes from one or more points of the client device 110; and The linear velocity of one or more axes from one or more points of the client device 110. Each axis may be recorded by the accelerometer as a data channel.

As another example, if the sensor 115 is a gyroscope of the client device 110, the sensor may record any of:

The rotational acceleration of one or more axes from one or more points of the client device 110; and The rotational velocity of one or more axes from one or more points of the client device 110.

The client device 110 can further include a detection module 120 that records data gathered by the sensor 115. Recorded sensor data can be stored in the data store 128. In some embodiments, the detection module 120 intermittently records sensor data as opposed to constantly recording sensor data. This may help reduce excessive processing or power consumption required by the client device 110. As an example, the detection module 120 intermittently records sensor data of a preset duration (e.g., 5 seconds, 10 seconds) with intervals between each set of recordings. In one embodiment, the interval between each set of recordings gathered by the detection module 120 is a fixed, default setting. Furthermore, the detection module 120 can be in communication with the online system 150 and can provide the recorded sensor data to the online system 150.

In some embodiments, the online system 150 can influence how often the sensor data is recorded by the detection module 120. As one example, the detection module 120 may record sensor data that corresponds to an immobile client device 110 (i.e., a client device that does not move beyond a threshold percentage in any direction, e.g., 0.1%). In that scenario, the sensor data includes low or nonexistent signals. Therefore, subsequent to the recorded sensor data being provided to the online system 150 by the detection module 120, the detection module 120 may receive feedback and/or instructions from the online system 150 to increase time intervals between each set of recording during which the detection module 120 does not record sensor data. Alternatively, if the detection module 120 provides recorded sensor data to the online system 150 that is highly varying (e.g., varying intensities and signal power), the detection module 120 may receive feedback from the online system 150 to decrease the time interval to decrease the probability that a trigger event is missed. In some embodiments, instead of providing the intermittently recorded sensor data to the online system 150 for detection of a trigger event, the client device 110 itself is configured to analyze the intermittently recorded sensor data to detect the trigger event. In this scenario, the detection module 120 can directly receive feedback from a different component/module of the client device 110 (e.g., analysis software running on a processor of the client device 110).

In some embodiments, after providing the intermittently recorded sensor data to the online system 150, the detection module 120 receives feedback from the online system 150 that instructs the detection module 120 to continuously record sensor data for a pre-determined duration. More specifically, the detection module 120 receives this feedback in response to the online system 150 detecting that a trigger event has occurred. In doing so, the detection module 120 ensures that the data corresponding to the trigger event is fully gathered and recorded for the pre-determined duration. The detection module 120 can provide the continuously recorded sensor data to the online system 150 for further analysis.

Example Online System

The online system 150 trains multiple machine learning models during a training phase that can be applied during a deployment phase in order to accurately identify personal characteristics of an individual. Generally, each of the data preprocessing module 155, the reference sorting module 160, and the feature extraction module 165 processes the sensor data obtained from the sensors of a client device, such as the client device 110 shown in FIG. 1. As used hereafter, processed sensor data refers to the data after processing through the data preprocessing module 155, the reference sorting module 160, and the feature extraction module 165.

During the training phase, the processed sensor data is provided to the event detection model module 170 and the classifier model module 175 to train their respective machine learning models. During the deployment phase, the processed sensor data is applied as input to a machine learning model such that a trigger event or the personal characteristics of the individual can be identified.

The data preprocessing module 155 receives gathered sensor data and preprocesses the sensor data to prepare the sensor data for further analysis. As one example, the data preprocessing module 155 removes noise from the sensor data. Specifically, the data preprocessing module 155 can apply a filter in order to eliminate the noise. In some embodiments, the filter is a fourth order Butterworth filter. The fourth order Butterworth filter may be configured as a bandpass filter to allow passage of frequencies between 0.5 Hz and 12.5 Hz. In other embodiments, the filter can be applied to other frequency ranges.

Additionally or alternatively, the data preprocessing module 155 normalizes the sensor data. As one example, the data preprocessing module 155 may normalize the sensor data such that the values of the sensor data are between predetermined values (e.g., −1 and +1). To do so, the data preprocessing module 155 can first identify characteristics of the sensor that originally gathered the sensor data and normalize the sensor data according to the identified characteristics. As an example, the data processing module 155 identifies a maximum detectable value of the sensor and normalizes the sensor data to the maximum value. The data processing module 155 provides the preprocessed sensor data to the reference sorting module 160.

The reference sorting module 160 shifts the frame of reference of a received sensor data from a first frame of reference to a second frame of reference. For example, the sensor data may initially be in the frame of reference of the client device 110, given that the sensor data was captured by sensors of the client device 110. The initial frame of reference of the client device 110 may be provided by the client device 110, or may have been previously determined by the online system 150 when applying the event detection model. In various embodiments, the reference sorting module 160 shifts the sensor data to a second frame of reference that corresponds to the walking individual.

Figure 2:
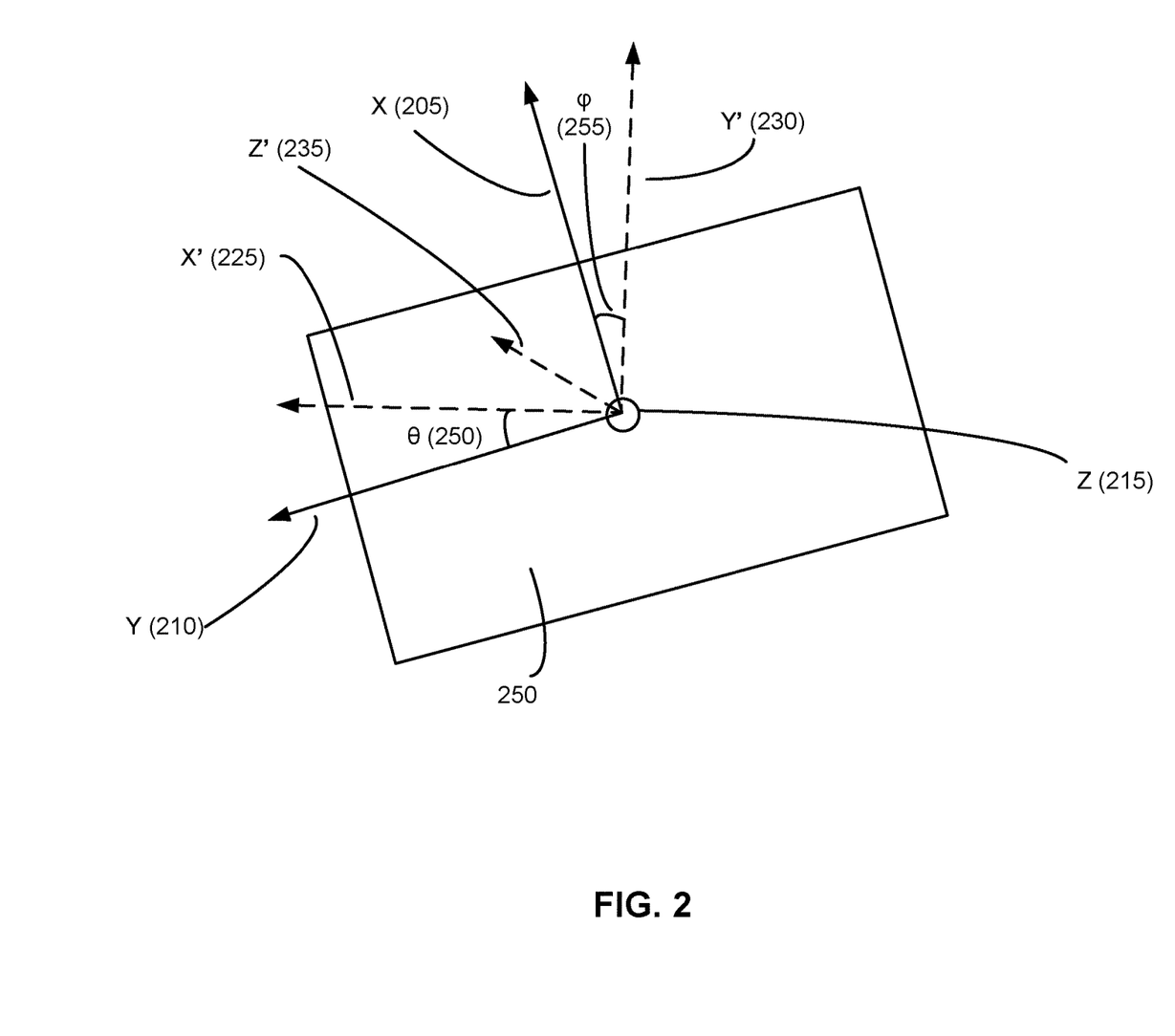
FIG. 2 illustrates the shifting from a client device's frame of reference to an individual's frame of reference, in accordance with an embodiment.

Reference is now made to FIG. 2, which illustrates the shifting from a client device's frame of reference to a walking individual's frame of reference, in accordance with an embodiment. As depicted in FIG. 2, the client device 250 (represented by a rectangle in the figure) may have an initial orientation and frame of reference when gathering sensor data. For example, the initial orientation may be indicated by the solid lines of the X-axis (205), the Y-axis (210), and the Z-axis (215). The Z-axis, as shown in FIG. 2, is directed out of the page (i.e., normal to the page). Although the subsequent description refers to accelerometer sensor data gathered by an accelerometer, the description may also apply to sensor data gathered by other types of sensors of the client device 110, e.g., a gyroscope.

The reference sorting module 160 transforms the initial X-axis (205), Y-axis (210), and Z-axis (215) to a second frame of reference corresponding to the walking individual. Specifically, FIG. 2 depicts the second frame of reference as the X'-axis (225), the Y'-axis (230), and the Z'-axis (235). The second frame of reference may be referred to as the true X, Y, and Z-axes. In some embodiments, the X'-axis (225) corresponds to the horizontal axis of the walking individual. In other words, the X'-axis (225) corresponds to (i.e., is aligned with) the direction that the individual is walking in. In some embodiments, the Y'-axis (230) corresponds to the vertical axis of the walking individual, which, in other words, corresponds to the vertical movement of the walking individual. In some embodiments, the Z'-axis (235) corresponds to the side-to-side movement of the walking individual. For example, the Z'-axis (235) corresponds to the side-to-side hip movement of the walking individual (and is orthogonal to both the X' and Y' axes).

To achieve the transformation of the sensor data from the first frame of reference to a second frame of reference, the reference sorting module 160 sorts the data channels of the sensor data corresponding to the axes and applies a rotation matrix. For example, the reference sorting module 160 sorts the different channels (e.g., X-axis (205), Y-axis (210), and Z-axis (215)) of accelerometer sensor data gathered by the accelerometer of the client device 110. In one embodiment, the reference sorting module 160 determines the overall variance of each channel of the accelerometer sensor data and sorts the channels by their overall variance (e.g., highest variance to lowest variance). In some embodiments, the reference sorting module 160 determines other characteristics of each channel such as the overall power of the signal in each channel.

Sorting the different channels can implicitly reduce the angular difference between the initial frame of reference of the client device and the second frame of reference of the walking individual. Referring back to FIG. 2, the sorted data channels may be in the following order:

$$\begin{bmatrix} Y\ (210) \\ X\ (205) \\ Z\ (215) \end{bmatrix}$$

Namely, the accelerometer data channel corresponding to the Y-axis (210) may have the highest variance because the vector of the directional motion of the individual walking has a smaller angular difference to the Y-axis (210) compared to the other axes in the initial frame of reference. The accelerometer data channel corresponding to the X-axis (205) may have the second highest variance because of the vertical motion of the individual while walking. The accelerometer data channel corresponding to the Z-axis (215) may have the least highest variance because of the limited side-to-side motion of the individual while walking. As such, the sorted data channels are considered as:

$$\begin{bmatrix} Y\ (210) \\ X\ (205) \\ Z\ (215) \end{bmatrix} = \begin{bmatrix} \text{Sorted } X\text{-axis} \\ \text{Sorted } Y\text{-axis} \\ \text{Sorted } Z\text{-axis} \end{bmatrix}$$

With the accelerometer data channels sorted, the reference sorting module 160 applies a rotation matrix to the sensor data in each data channel to transform each accelerometer data channel to the second frame of reference corresponding to X'-axis (225), the Y'-axis (230), and the Z'-axis (235), respectively. As specifically depicted in FIG. 2, there may be an angular rotation of θ (250) between the Y-axis (210) (also referred to as the sorted X-axis), and the true X'-axis (225). Additionally, there may be an angular rotation of (255) between the X-axis (205) (also referred to as the sorted Y-axis) and the true Y'-axis (230). Similarly, there may be an angular rotation (not shown) between the Z-axis (215) and the true Z'-axis (235).

The applied rotation matrix transforms each accelerometer data channel according to each respective the angular rotation (e.g., θ (250) or ψ (255)). Specifically, the specific angular rotation amount (e.g., θ (250) or ψ (255)) for each sensor data channel can be determined by the reference sorting module 160 given the initial orientation of the client device 110. The orientation of the device 110 may be previously provided by the client device 110. As another example, the orientation of the device 110 may be previously determined by the online system 150. For example, as will be described in further detail below, the event detection model can be applied to sensor data and can determine that the client device 110 is in a particular orientation.

Each sorted and transformed accelerometer data channel is appropriately set in the frame of reference of the walking individual. This transformed sensor data is provided to the feature extraction module 165.

The feature extraction module 165 extracts features from the sensor data that is now in the frame of reference of the walking individual. Specifically, features of the transformed sensor data can include:

A mean value for each accelerometer channel
A mean value for each gyroscope channel
A standard deviation for each accelerometer channel
A standard deviation for each gyroscope channel
An average number of samples per gait cycle
A magnitude of the accelerometer vector $\sqrt{x^2+y^2+z^2}$
A magnitude of the gyroscope vector $\sqrt{x^2+y^2+z^2}$
A signal energy for each accelerometer channel
A signal energy for each gyroscope channel
A distribution of signal power for each channel The feature extraction module 165 may perform various signal analysis algorithms to extract the features. As one example, to determine the average number of samples per gait cycle, the feature extraction module 165 performs a fast Fourier transform (FFT) to transform the sensor data to the frequency domain. As such, the feature extraction module 165 can determine the frequency of a gait cycle and subsequently, the number of samples per gait cycle given the frequency domain sensor data. As another example, to determine the distribution of signal power the transformed sensor data is further split into bins. In one embodiment, the signal is split into 3 Hz bins and the signal power is determined for each bin. Therefore, the distribution of the signal power across the bins can be utilized as an extracted feature.

The feature extraction module 165 constructs a feature vector that includes a set of extracted features as described above. As such, during the training phase, the constructed feature vector can be provided to the event detection model module 170 or the classifier model module 175 as an input to train a machine learning model. Alternatively, during the deployment phase, the constructed feature vector can be provided as an input to the trained machine learning model such that a trigger event or a classification of a personal characteristic can be determined.

The event detection model module 170 trains a machine learning model, more specifically the event detection model, during the training phase. Additionally, the classifier model module 175 trains a machine learning model, more specifically the classification model, during the training phase. Training of the event detection model and the classification model by each respective module is described in further detail below in reference to FIG. 3. Deployment of each of the event detection model and the classification model is described in further detail below in reference to FIG. 4.

Example Training Process of Machine Learning Models

Figure 3:
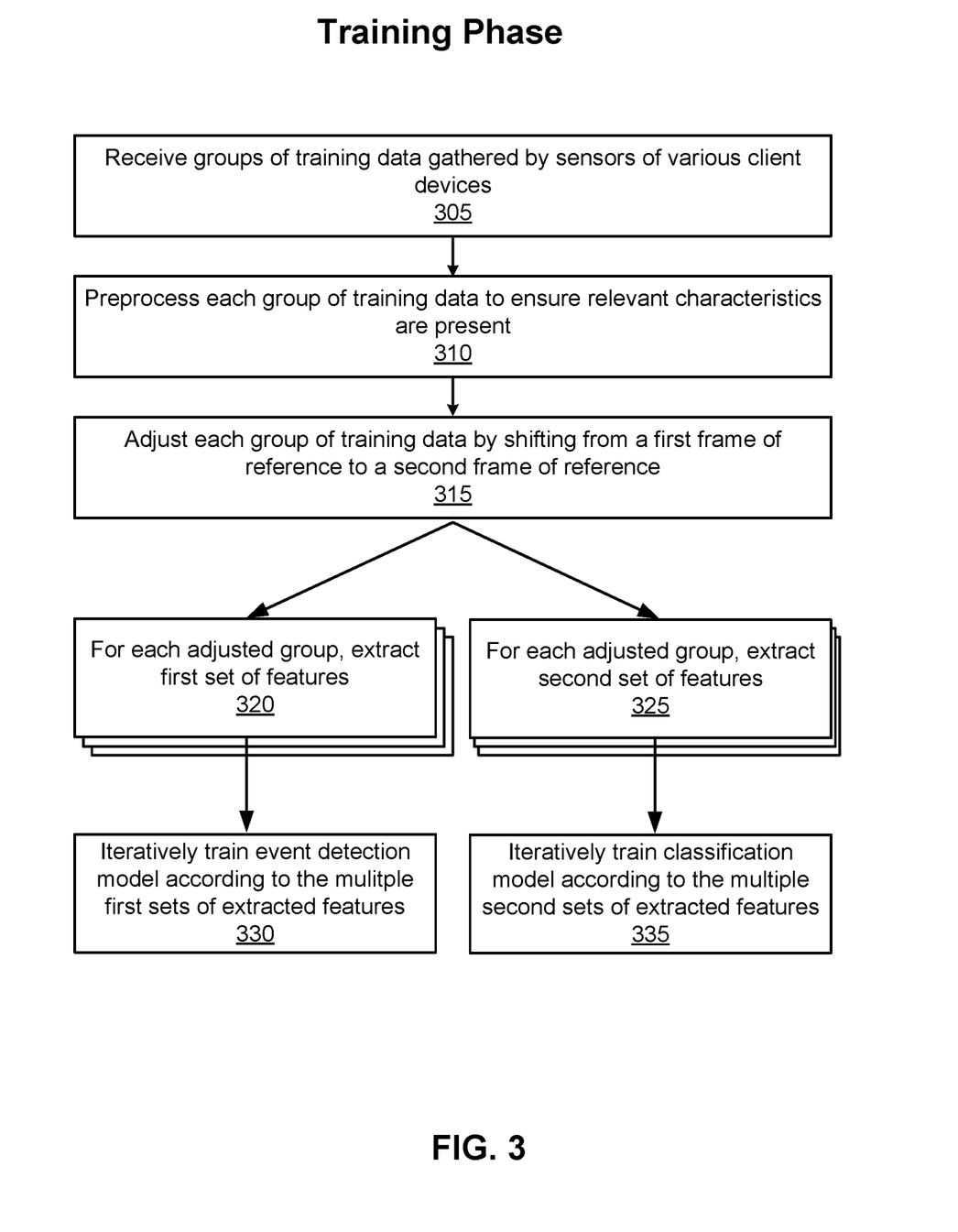
FIG. 3 illustrates a flow diagram describing the training process of machine learning models, in accordance with an embodiment.

FIG. 3 illustrates a flow diagram describing the training process of machine learning models, in accordance with an embodiment. In various embodiments, the online system 150 trains machine learning models using a machine learning technique such as random forests. Additionally, machine learning techniques can include, but are not limited to, neural networks, naïve Bayes, support vector machines, short-term memory networks, logistic regression, bagged trees, decision trees, boosted trees and machine learning used in HIVE™ frameworks, in different embodiments.

Each of the machine learning models are trained using training data that originates from sensor data gathered from walking individuals. Specifically, the online system 150 receives 305 groups of training data. Each group of training data is gathered by a sensor of a client device. In some embodiments, the training data corresponds to experimental data captured by sensors corresponding to N different individuals under a controlled environment. For example, sensor data can be gathered by sensors in client devices that are each associated with one of N different individuals of varying personal characteristics (e.g., age, gender, height, and the like). Therefore, as each individual walks, sensor data is gathered by the sensors of each client device and recorded as training data. In some embodiments, each of the client devices associated with one of the N different individuals may also be held in a certain environment (e.g., front pocket, back pocket, gym bag, and the like) and in a particular orientation (upside down, upright, and the like). As such, data (e.g., the personal characteristics of individuals and the environment and/or orientation of the client devices in the training data) recorded from these previous walking individuals may be used as output labels for training the machine learning models.

As depicted in FIG. 3, in various embodiments, during the training phase, the online system 150 can preprocess 310 the training data and adjust 315 the training data by shifting the frame of reference, as described above in reference to the data preprocessing module 155 and the reference sorting module 160, respectively. During the training phase, the online system 150 extracts 320 a first set of features from each group of training data and additionally extracts 325 a second set of features from each group of training data. The first set of extracted features is used to train 330 the event detection model (for detecting trigger events) whereas the second set of extracted features is used to train 335 the classification model (for determining personal characteristics of the user). Thus, the models can each be iteratively trained using sets of extracted features, each set derived from a group of training data previously captured by a sensor of a client device and corresponding to a walking individual. In various embodiments, the first set of extracted features and the second set of extracted features include some or all of the features described above in reference to the feature extraction module 165. In various embodiments, the first set of extracted of features used to train the event detection model is specifically as follows:

A mean value for each accelerometer channel
A standard deviation for each accelerometer channel
An average number of samples per gait cycle
A magnitude of the accelerometer vector ($\sqrt{x^2+y^2+z^2}$)

Referring specifically to the training of an event detection model by the event detection model module 170, the event detection model is trained to accurately identify an orientation and/or environment of the client device and to detect a trigger event. Specifically, the event detection model module 170 receives multiple first sets of extracted features and iteratively trains the event detection model using each first set of extracted features as input. As an example, a first set of extracted features may be illustrated in a feature vector as:

$$\begin{bmatrix} \text{Mean of } X\text{-axis accelerometer channel} \\ \text{Mean of } Y\text{-axis accelerometer channel} \\ \text{Mean of } Z\text{-axis accelerometer channel} \\ \text{Average number of samples per gait cycle} \end{bmatrix}$$

In various embodiments, the event detection model is trained to first identify an orientation and/or environment that the client device is in and to subsequently identify whether a trigger event (e.g., a walking individual) is detected.

Specifically, given a first set of extracted features, the event detection model is trained to output an orientation and/or environment that client device was in when the sensors of the client device gathered the data corresponding to the first set of extracted features. For example, the event detection model can be trained to output one of many client device orientations (e.g., face down, face up, and the like) as well as the environment that the client device was in (e.g., in a gym bag, in a front pocket, in a back pocket, and the like). One example as to how the event detection model decides upon a client device orientation may involve the event detection model calculating a value. The event detection model identifies a client device orientation and/or environment based on the fact that the calculated value falls within a confidence interval that corresponds to the identified client device orientation and/or environment.

The event detection model may further identify whether the first set of extracted features corresponds to a trigger event (e.g., a walking individual) given the fact that the event detection model has identified that the client device is in the identified client device orientation and/or environment. Here, the event detection model may be trained to output that the first set of extracted features corresponds to a trigger event or that the first set of extracted features does not correspond to a trigger event. Similar to the process of identifying a client device orientation, the event detection model can make this determination by calculating a value and determining whether the calculated value falls within a confidence interval that corresponds to one of the two output choices. Altogether, the trained event detection model is trained to accurately predict 1) the environment and/or orientation of the client device and 2) whether a trigger event is detected.

Referring now to the training of a classification model by the classifier model module 175, this process may be similarly conducted in comparison to the training of the event detection model by the event detection model module 170. Here, the classification model is iteratively trained using, as input, multiple second sets of extracted features. The classification model is trained to output a classification as to the individual's personal characteristic. In various embodiments, the classifier model module 175 may train various classification models, where each classification model is specifically trained to determine a particular personal characteristic (e.g., age, height, gender).

For example, a classification model can be trained to output an age range (e.g., 10-17, 18-23, 24-35, and the like). As another example, a classification model can be trained to output a height range (e.g., under 5'0", between 5'0" and 5'4", between 5'4" and 5'8", between 5'8" and 6'0", and the like). Another, classification model can be trained to output a gender (e.g., male or female). As described previously regarding the event detection model, the classification model can be trained to make an output determination by calculating a value and determining a confidence interval that the calculated value falls within. The confidence interval corresponds to one of the output choices.

The event detection model and the classification model may both be trained using random forest machine learning methods. Each model is trained to minimize an error such as an environment detection error, a trigger event error, or a classification error. For example, referring to the classification model, given a feature vector of extracted features from a training sensor data, the classification model may make a determination as to the individual's age. The determined individual's age is compared to the actual individual's age from the training data. If the classification model is incorrect, hence a classification error, the classification model can be further trained to reduce the classification error. For example, the confidence interval corresponding to each output choice can be adjusted to reduce the error.

Example Interaction Diagram for Identifying Personal Characteristics

Figure 4:
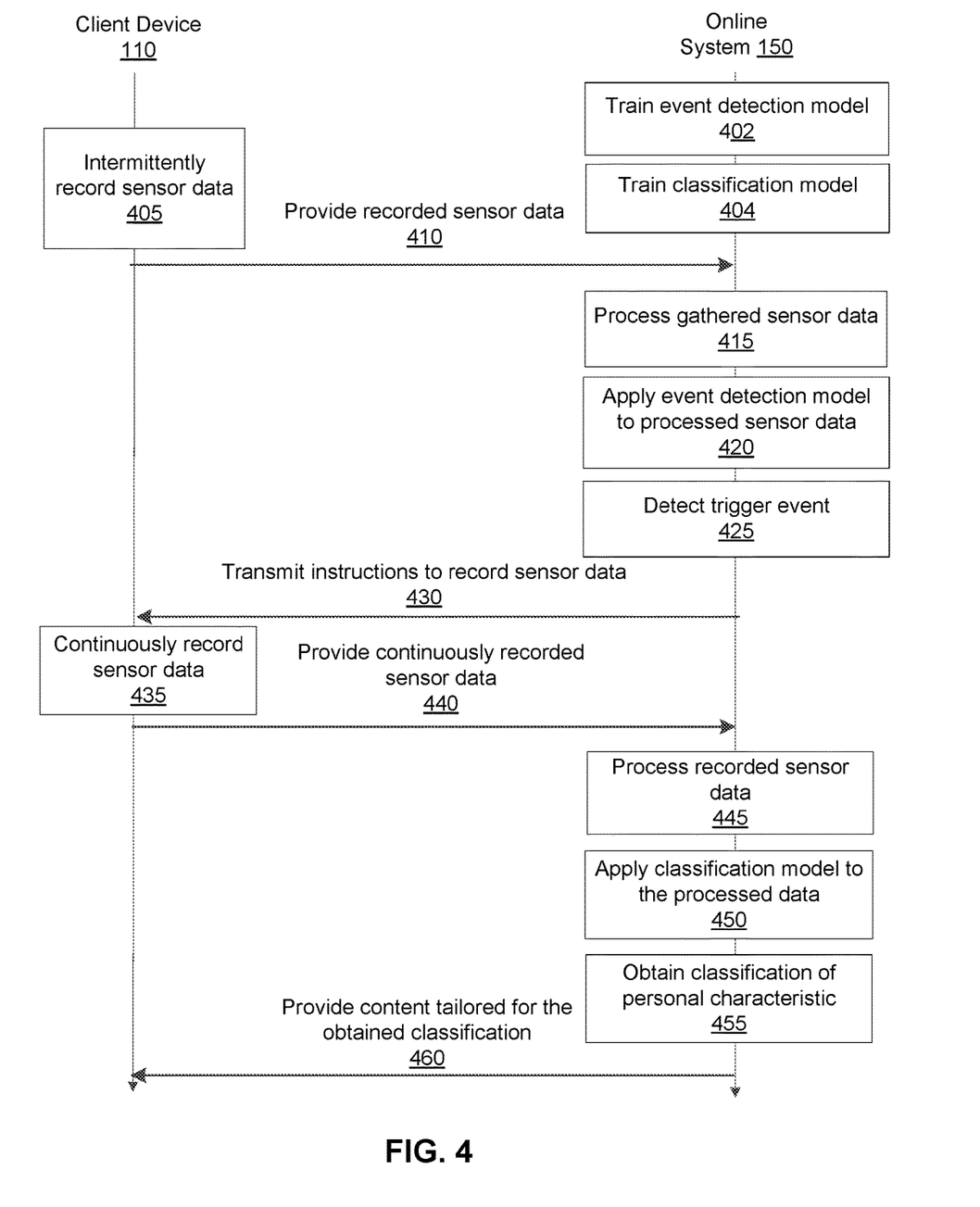
FIG. 4 illustrates an interaction diagram between an online system and a client device for identifying characteristics of an individual associated with the client device, in accordance with an embodiment.

FIG. 4 illustrates an interaction diagram between an online system 150 and a client device 110 for identifying personal characteristics of an individual associated with the client device 110, in accordance with an embodiment.

During a training phase, the online system 150 trains 402 an event detection machine learning model. Specifically, the online system 150 trains an event detection machine learning model that takes, as inputs, extracted features from intermittently recorded sensor data and outputs a determination as to whether a trigger event has occurred. Also during the training phase, the online system 150 trains 404 a classification machine learning model that takes, as inputs, extracted features from continuously recorded sensor data and outputs a determination as to a personal characteristic of an individual that the sensor data was obtained from.

The client device 110 intermittently records 405 sensor data and provides 410 the intermittently recorded sensor data to the online system 150. In some embodiments, the client device 110 provides the intermittently sensor data immediately after recording.

The online system 150 receives and processes 415 the intermittently recorded sensor data. More specifically, the data preprocessing module 155, the reference sorting module 160, and the feature extraction module 165 perform the processing of the intermittently recorded sensor data. In one embodiment, the processed sensor data includes extracted features extracted from the intermittently recorded sensor data. The online system 150 applies 420 the event detection model to the processed sensor data to determine whether a trigger event has occurred.

As described above, the extracted features are applied, as inputs, to the event detection model. Therefore, the event detection model determines the orientation and/or environment that the client device is in as well as whether a trigger event is detected.

In some scenarios, the event detection model determines an orientation and/or environment of the client device 100 but does not detect a trigger event. The online system 150 can provide feedback to the client device 110 such that the client device 110 can alter how the intermittently recorded sensor data is subsequently recorded. In other scenarios, the event detection model successfully detects 425 a trigger event corresponding to a particular orientation of the client device 100. The online system 150 transmits 430 instructions to the client device 110 to continuously or semi-continuously record sensor data.

In various embodiments, the client device 110 continuously gathers and records sensor data 435 for a pre-determined duration through various sensors 115 of the client device 110 to ensure that the sensor data corresponding to the trigger event is captured. The client device 110 provides 440 the continuously recorded sensor data to the online system 150 for further analysis.

The online system 150 processes 445 the continuously recorded sensor data. As described above, in some embodiments, the data preprocessing module 155, the reference sorting module 160, and the feature extraction module 165 perform the processing of the continuously recorded sensor data. In one embodiment, a feature vector of extracted features corresponding to the continuously recorded sensor data is obtained. The online system 150 applies 450 the extracted features as inputs to the trained classification model to determine personal characteristics (e.g., age, gender, height) of the individual.

The online system 150 obtains 455 the classification from the trained classification model and can utilize the classification for a variety of purposes. As one example, the online system 150 can provide 460 content that is tailored for the individual given the obtained classification. For example, if the online system 150 determines that the individual is between 18-24 years old, then it may provide an advertisement to the individual that would be of interest to the 18-24 year old demographic group.

Example Machine Architecture

Figure 5:
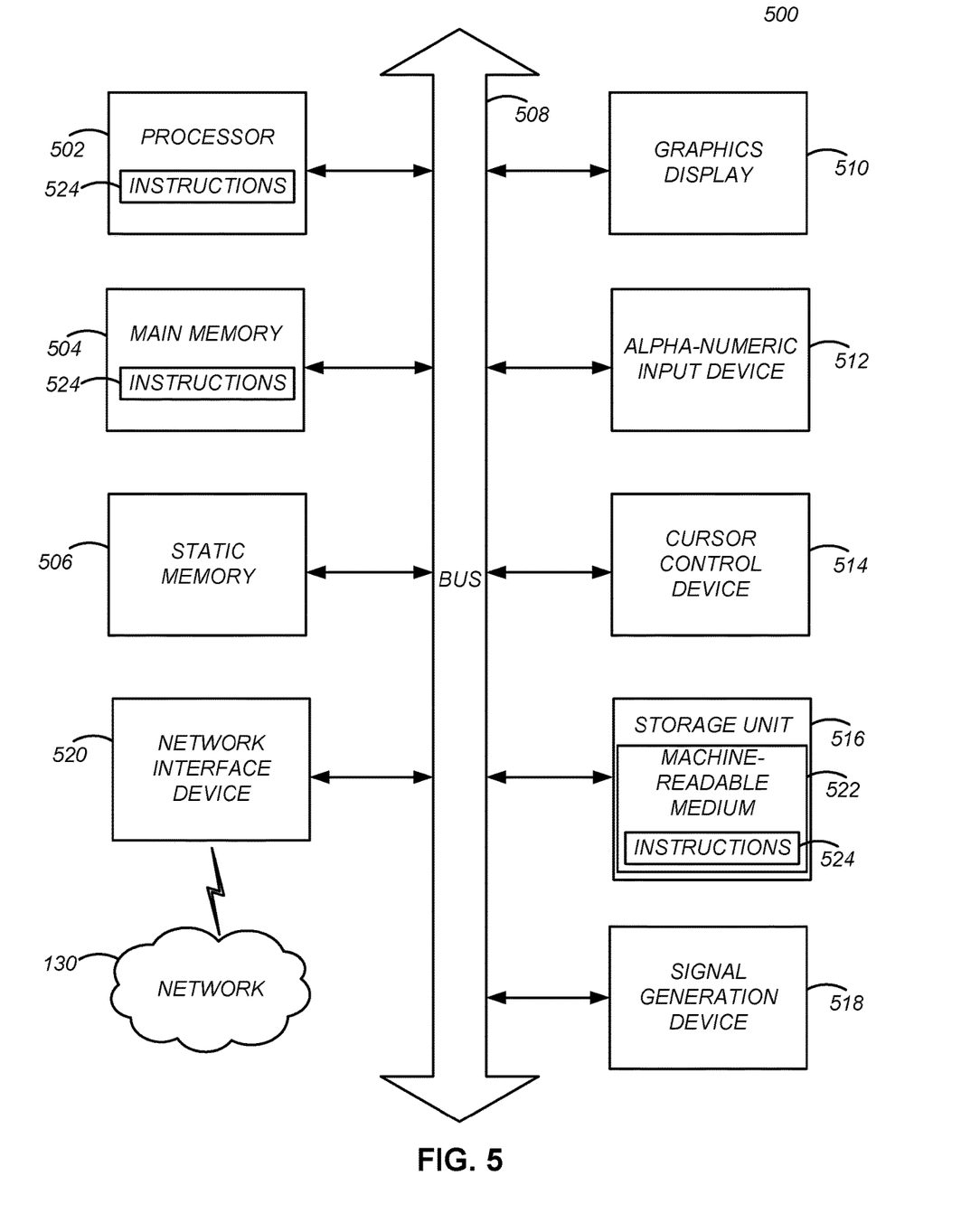
FIG. 5 is a block diagram illustrating components of an example machine able to read instructions from a machine-readable medium and execute them in a processor (or controller), in accordance with an embodiment.

FIG. 5 is a block diagram illustrating components of an example machine able to read instructions from a machine-readable medium and execute them in a processor (or controller). Such an example machine, as shown in FIG. 5, can represent or be employed by the online system 150 or can represent the client device 110 as shown in FIG. 1. Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 500 is used to execute the processes and functionality described in FIGS. 1-4. It is noted that the computer system 500 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508. As an example, the data store 128 or the training data store 180 depicted in the system environment 100 in FIG. 1 may be embodied as a storage unit 516 shown in FIG. 5.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 130 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Embodiments of the invention as disclosed provides benefits and advantages that enable the remote identification of personal characteristics of an individual. This can be implemented without requiring input from the individual and can be done in a non-intrusive manner. Furthermore, implementation of machine learning models, as described above, enable the identification of personal characteristics to be highly accurate, thereby enabling the subsequent use of the identified personal characteristics, such as for the delivery of tailored content or advertisements.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-5. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 524) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 502 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 504). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting user interest in a provided content item through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, from a client device, sensor data gathered by one or more sensors of the client device;
processing the gathered sensor data to obtain first extracted features;
applying a trained event detection model to the first extracted features of the processed sensor data, the trained event detection model trained to detect whether the first extracted features describe a walking individual based on at least an orientation of the client device and a manner of being held by a user, the first extracted features input into the trained event detection model, the orientation and the manner of being held by the user being output by the trained event detection model, the trained event detection model being a supervised machine learning model trained using labeled training data;
detecting, based on output from the trained event detection model, that the extracted features describe a walking individual;
responsive to detecting that the extracted features describe a walking individual, instructing one or more sensors of the client device to activate and continuously record sensor data;
receiving, from the client device, the continuously recorded sensor data gathered by the one or more sensors of the client device, the continuously recorded sensor data capturing movement patterns of the walking individual that are caused by the walking individual continuing to walk;
processing the continuously recorded sensor data to obtain second extracted features;
applying a trained classification model to the second extracted features of the continuously recorded sensor data, wherein the trained classification model is trained using input feature data based on extracted features from continuously recorded sensor data capturing movement patterns of a plurality of walking individuals that are caused by each corresponding walking individual continuing to walk, and on output labels that indicate a gender for each corresponding walking individual; and
determining a gender of the walking individual based on the output of the trained classification model.

2. The method of claim 1, further comprising:
transmitting to the client device, responsive to detecting that the first extracted features describe the walking individual, instructions to continuously record sensor data corresponding to a trigger event.

3. The method of claim 1 further comprising:
providing content to the client device, subsequent to determining the gender of the walking individual, the provided content selected according to the determined gender of the walking individual.

4. The method of claim 1 further comprising determining one of the walking individual's age or height.

5. The method of claim 1, wherein processing the gathered sensor data or processing the continuously recorded sensor data comprises:
preprocessing the sensor data;
adjusting the preprocessed sensor data by shifting from a first frame of reference corresponding to the client device to a second frame of reference corresponding to the walking individual; and
extracting features from the adjusted sensor data.

6. The method of claim 5, wherein preprocessing the sensor data comprises:
filtering the received sensor data to remove noise; and
normalizing the filtered sensor data based on the sensor of the client device that gathered the sensor data.

7. The method of claim 5, wherein the features extracted from the adjusted sensor data comprises one or more of:
a mean value of the sensor data;
a standard deviation value of the sensor data;
an average number of samples per gait cycle derived from the sensor data;
a magnitude of the sensor data;
a signal energy of the sensor data; and
a distribution of signal power of the sensor data.

8. The computer-implemented method of claim 7, wherein each of the features extracted from the adjusted sensor data is originally gathered by one of an accelerometer or a gyroscope of the client device.

9. The method of claim 5, wherein shifting from a first frame of reference corresponding to the client device to a second frame of reference corresponding to the walking individual comprises:
determining a variance of one or more channels in the sensor data;
sorting the one or more channels according to their determined variances; and
applying a rotation matrix to the one or more channels, the rotation matrix determined based on the first frame of reference corresponding to the client device.

10. A non-transitory computer-readable medium comprising computer program code, the computer program code when executed by a processor of a client device causes the processor to:
receive, from a client device, sensor data gathered by one or more sensors of the client device;
process the gathered sensor data to obtain first extracted features;
apply a trained event detection model to the first extracted features of the processed sensor data, the trained event detection model trained to detect whether the first extracted features describe a walking individual based on at least an orientation of the client device and a manner of being held by a user, the first extracted features input into the trained event detection model, the orientation and the manner of being held by the user being output by the trained event detection model, the trained event detection model being a supervised machine learning model trained using labeled training data;
detect, based on output from the trained event detection model, that the extracted features describe a walking individual;
responsive to detecting that the extracted features describe a walking individual, instruct one or more sensors of the client device to activate and continuously record sensor data;
receive, from the client device, continuously recorded sensor data gathered by one or more sensors of the client device, the continuously recorded sensor data capturing movement patterns of the walking individual that are caused by the walking individual continuing to walk;

process the continuously recorded sensor data to obtain second extracted features;

apply a trained classification model to the second extracted features of the continuously recorded sensor data, wherein the trained classification model is trained using input feature data based on extracted features from continuously recorded sensor data capturing movement patterns of a plurality of walking individuals that are caused by each corresponding walking individual continuing to walk, and on output labels that indicate a gender for each corresponding walking individual; and determine a gender of the walking individual from on the output of the trained classification model.

11. The non-transitory computer-readable medium of claim 10 further comprising computer program code that when executed by the processor of a client device causes the processor to:

transmit to the client device, responsive to detection of the extracted features describing the walking individual, instructions to continuously record sensor data corresponding to a trigger event.

12. The non-transitory computer-readable medium of claim 10 further comprising computer program code that when executed by the processor of a client device causes the processor to:

provide, subsequent to obtaining the gender of the walking individual, content to the client device, the provided content selected according to the obtained gender of the walking individual.

13. The non-transitory computer-readable medium of claim 10 further comprising computer program code that when executed by the processor of a client device causes the processor to determine one of the walking individual's age or height.

14. The non-transitory computer-readable medium of claim 10, wherein the computer program code to process the gathered sensor data or the computer program code to process continuously recorded sensor data further comprises computer program code that when executed by the processor causes the processor to:

preprocess the sensor data;

adjust the preprocessed sensor data by shifting from a first frame of reference corresponding to the client device to a second frame of reference corresponding to the walking individual; and extract features from the adjusted sensor data.

15. The non-transitory computer-readable medium of claim 14, wherein the computer program code to preprocess the sensor data comprises computer program code that when executed by the processor causes the processor to:

filter the received sensor data to remove noise; and normalize the filtered sensor data based on the sensor of the client device that gathered the sensor data.

16. The non-transitory computer-readable medium of claim 14, wherein the features extracted from the adjusted sensor data comprises one or more of:

a mean value of the sensor data;

a standard deviation value of the sensor data;

an average number of samples per gait cycle derived from the sensor data;

a magnitude of the sensor data;

a signal energy of the sensor data; and a distribution of signal power of the sensor data.

17. The non-transitory computer-readable medium of claim 16, wherein each of the features extracted from the adjusted sensor data is originally gathered by one of an accelerometer or a gyroscope of the client device.

18. The non-transitory computer-readable medium of claim 14, wherein the computer program code to shift from a first frame of reference corresponding to the client device to a second frame of reference corresponding to the walking individual further comprises computer program code that when executed by the processor causes the processor to:

determine a variance of one or more channels in the sensor data;

sort the one or more channels according to their determined variances; and apply a rotation matrix to the one or more channels, the rotation matrix determined based on the first frame of reference corresponding to the client device.

* * * * *